United States Patent
Pan

[15] 3,704,920
[45] Dec. 5, 1972

[54] COMBINATION CLAMPING AND BEARING SYSTEM
[72] Inventor: Coda Hoong-Tao Pan, Latham, N.Y.
[73] Assignee: Mechanical Technology Incorporated, Latham, N.Y.
[22] Filed: Jan. 25, 1971
[21] Appl. No.: 109,483

[52] U.S. Cl. ............................................... 308/9
[51] Int. Cl. ........................................... F16c 17/16
[58] Field of Search ........................... 308/9, 121, 122

[56]     References Cited
         UNITED STATES PATENTS
3,506,314  4/1970  Gross et al. .................... 308/9
3,394,972  7/1968  Bossler, Jr. ..................... 308/122
3,174,809  3/1965  Mackie ........................... 308/9

Primary Examiner—Milton Kaufman
Assistant Examiner—Frank Susko
Attorney—Joseph V. Claeys and Charles W. Helzer

[57] ABSTRACT

A self-acting combination clamping and bearing system is provided which comprises two members having confronting bearing surfaces, one of which is a bearing surface of suitable elastomeric material. The confronting surfaces of the two members are arranged in self-opposed relationship to constrain relative movement of the members. Passages are provided for the supply of fluid lubricant under pressure to the interface of the confronting surfaces. The lubricant pressure deforms the surface of the elastomeric member and forms a bearing profile so that the members are thereafter supported for relative movement on a load supporting film of fluid lubricant.

There is also disclosed a particular application of the invention in which the combination clamping and bearing system is used to support the two-degrees-of-freedom rotor on the shaft of a directional gyroscope of an assault weapon.

11 Claims, 3 Drawing Figures

CODA H. T. PAN
INVENTOR
BY [signature]
HIS ATTORNEY

COMBINATION CLAMPING AND BEARING SYSTEM

This invention relates to a novel combination clamping and bearing system and more particularly to a self-acting system wherein the same structure is made to function in one mode as a brake means to constrain relative movement of members and in another mode as a bearing means to support such members for relative movement on a film of fluid lubricant.

In a number of devices it is required that confronting surfaces of relatively movable members be constrained against relative movement when the device is inactive yet also provide that these members be supported by an adequate bearing system for relative movement when the device is in operation. In the past the constraining function and the supporting function have been performed by discrete means, wherein a separate clamping means provides the constraining function and a separate bearing means provides the supporting function; and wherein an external controlling or actuating means selectively causes the clamping means or the bearing means to be brought into operation.

Accordingly, it is an object of this invention to provide a new and improved clamping and bearing system which with the same structure is operative in one mode to constrain two members against relative movement and in another mode to convert to a low friction, fluid film bearing when a load supporting fluid film is generated.

It is another object of this invention to provide a new and improved clamping and bearing system which does not require high machining accuracy, is easy to manufacture and assemble and consequently can be manufactured at low cost.

It is a further object of this invention to provide a new and improved clamping and bearing system which is especially useful in gyroscopic devices wherein the same structure operates in one mode to constrain the rotor against relative movement on the shaft and in another mode to support the rotor on the load bearing lubricant film of a low friction bearing.

Briefly stated, in accordance with one aspect of this invention, a system is provided which comprises, in broad terms, first and second members having confronting bearing surfaces one of which is compliant and may be provided, for example, by a body of a suitable elastomeric material. The confronting bearing surfaces may be of cylindrical, spherical, rectangular, or any other suitable configuration and are arranged in self-opposed relationship to constrain relative movement of the members. The system also includes means for feeding a fluid lubricant under pressure to the interface of the confronting bearing surfaces. The lubricant pressure is selected to cause the compliant bearing surface to elastically deform and to establish a bearing profile so that the members are thereafter supported for relative movement on a film of fluid lubricant.

The novel features believed characteristic of this invention are set forth with particularity in the appended claims. The invention itself, however, and method of operation together with further objects and advantages thereof may best be understood by reference to the following description taken in conjunction with the accompanying drawings, wherein like reference numerals designate the same or similar components, and in which:

Figure 1:
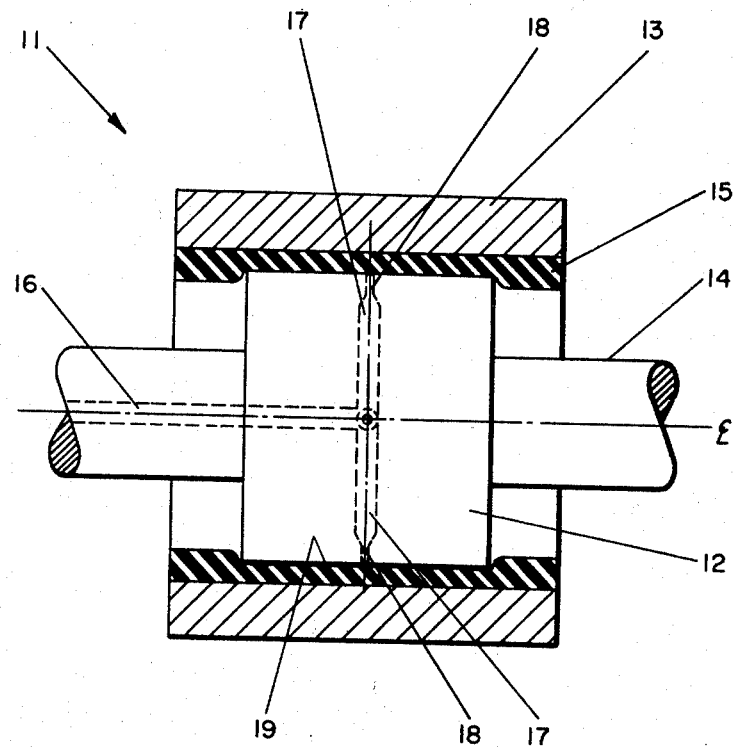
FIG. 1 is a diagrammatic partial section view representing one embodiment of the clamping and bearing system of the invention wherein the two members are in clamped relationship.
Figure 2:
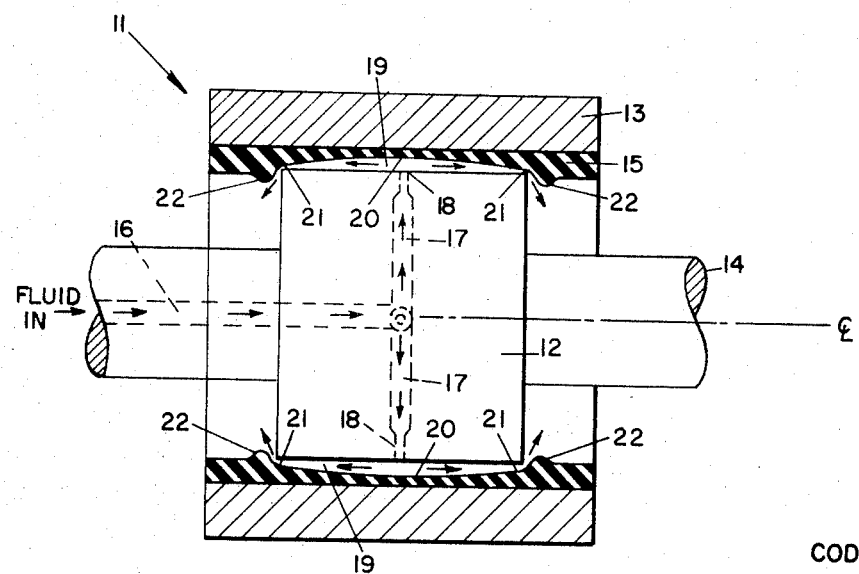
FIG. 2 is a similar diagrammatic partial section view of the same embodiment, as shown in FIG. 1, showing the members in unclamped relationship and supported on a load bearing film of lubricant.

FIGS. 1 and 2 illustrate one embodiment of a practical application of the concepts of the present invention for use with devices wherein members are capable of relative motion in a rotational or axial direction. It will be understood that while the embodiment shown in FIGS. 1 and 2 is in the form of a rotating or sliding clamping and bearing system, the specific illustration is by way of example only, since the clamping and bearing system described may be adapted for operating in a variety of different specific devices.

Referring now in particular to FIG. 1 there is shown an embodiment of the clamping and bearing system of this invention, generally designated as 11, comprising an inner member 12 and an outer member 13 having confronting bearing surfaces one of which is of a material capable of responding by elastic deformation to the application of a fluid lubricant under pressure to form a bearing profile and provide a compliant bearing. The inner member 12 is provided with a suitable connecting member, such as a shaft, 14. As shown, the compliant bearing surface is provided by an elastomeric member 15, attached to the outer member 13, which may be, for example, a layer of suitable silicone rubber attached in any suitable manner, such as by metal priming and bonding. Members 12 and 13 may be arranged for relative motion in a rotational or axial direction. Preferably, the outer member 13 and its affixed elastomeric member 15 possess a greater axial length than does the inner member 12. The confronting bearing surface of the elastomeric member 15 has a smaller inside dimension than does the outside confronting surface of the inner member 12. Thus when assembled, the elastomeric member 15 and the inner member 12 are in clamped relationship, the inner member compressing the elastomeric member against the outer member 13. As a result, the confronting surfaces of the inner member 12 and the elastomeric member 15 are subjected to compressive forces and the much increased surface traction provides clamping of one member with respect to the other. Consequently, when assembled, the combination clamping and bearing system of this invention is in the clamping mode and constrains relative movement of the two relatively movable members.

In further accord with this invention the connecting member 14 and the inner member 12 are provided with an axial passage 16 and radial distribution passages 17 terminating in orifices 18 which are located in the same radial plane around the perimeter of the inner member 12. These passages are provided for the purpose of feeding lubricant fluid under pressure to the interface 19 between the confronting surfaces.

Referring now to FIG. 2 there is shown the same embodiment of the clamping and bearing system of this invention as shown in FIG. 1 where the fluid lubricant under pressure is fed to the interface 19 between the confronting bearing surfaces. The compressed lubricant causes the elastomeric member 15 to yield elastically outwards by compressing it further against the outer member 13 thereby forming a bearing profile. As a result, the two members 12 and 13 are capable of low friction movement relative to each other supported on a load bearing film of lubricant.

As shown, when the fluid lubricant under pressure is fed to the interface 19 between the confronting bearing surfaces, a shallow depression 20 is created in the surface of the elastomeric member 15 in the region of high lubricant pressure. This causes some elastomer displacement towards the edges and forms bulges 22. Also, since the lubricant pressure is lower near the edges, the clearance 21 is less than the depression clearance 20. This elastic response of the elastomeric member causes the formation of an efficient seal, and an elastomeric bearing is created possessing the properties of high load capacity and low leakage. In this mode the clamping and bearing device acts as an elastomeric bearing and many of the known techniques employed in the design of bearings may, of course, be taken into consideration.

When the supply of lubricant under pressure is cut off, the film between the confronting bearing surfaces of the two members 12 and 13 disappears and the elastomeric member 15 returns to its original configuration with respect to the surface of the inner member 12, as is shown in FIG. 1, thereby clamping members 12 and 13 together and constraining relative movement of these members.

Preferably, the elastomeric member 15 should be elastic and incompressible. The thickness and hardness are chosen so that for a given geometry of the confronting surfaces and rotor mass the elastomeric member is compressed within its elastic limit to give the desired constraint to relative movement. Thus for a light rotor, for example, the thickness and hardness may be chosen so as to give a relatively light clamping force, whereas a heavier rotor may require a larger clamping force to constrain it. Preferably, the elastomer should exhibit a shear modulus of 50 to 100 psi, a Poisson's ratio of 0.45 to 0.48, a Shore A durometer hardness of 20 to 60, and a thickness in the range of 0.02 to 0.10 inches per inch diameter of member. In a particular application using such an elastomer a lubricant fluid supply pressure of 80 psi was employed. The specific pressure selected will depend upon a number of different factors and for many applications a pressure in the range of 80 to 250 psi will be found satisfactory.

While there has been recent activity directed to further development of elastomeric bearings none of the known teachings have suggested that an operative bearing could be provided where the two confronting bearing surfaces were in self-opposed relationship so as to initially hold the members in a tightly clamped relationship. It has been discovered, however, that, contrary to the general teachings and inconsistent with good engineering practice in the design of elastomeric bearings, even though two members are clamped tightly together through the medium of an elastomeric layer, a bearing profile can be established by suitable application of a fluid lubricant under pressure to the interface of the confronting bearing surfaces. Wholly unexpectedly, it has been found that in the very same structure a clamping arrangement can be provided which when desired can be converted to a bearing system by merely supplying fluid lubricant under pressure to the interface of the confronting, self-opposed bearing surfaces, one of which is compliant. The application of such fluid lubricant establishes the desired bearing profile so that thereafter a high quality elastomeric bearing is provided and the members are supported for relative movement on a load supporting film of fluid lubricant.

As separate and discrete mechanisms, clutches and brakes employing elastomeric material on one of the surfaces to clamp members and restrain them against relative movement or couple them together, as the case may be, have been well known in the art. Also, as separate and discrete mechanisms, various bearing systems, including the fluid film type, have also been well known in the art. Prior to this invention, however, no known system has ever combined in a single and extremely simple structure the two opposite and wholly inconsistent functions of braking in one mode and supporting for free relative movement on a load bearing lubricant film in an other mode.

The present invention, therefore, is predicated, in part, upon the discovery that two members even though clamped tightly together through an elastomeric layer can be converted by the simple expedient of feeding a fluid lubricant under pressure to the interface of the confronting bearing surfaces to at once convert that clamping-type structure to a bearing system.

As previously indicated, this invention has a wide range of applications in devices which require constraint of members against relative movement and support of such members on a suitable bearing system during operation. Examples of particular type of devices which require such constraint of movable members against movement from a preset position and support during operation on high quality bearings are gyroscopic devices, such as the directional gyroscopes used in navigation and with assault weapons and missiles of various types. This invention, therefore, is especially useful in connection with gas bearing supported gyroscopes and one embodiment of the invention will be described in detail in that connection. This embodiment provides for holding the two-degrees-of-freedom rotor of an assault weapon guidance gyroscope in fixed position during shipment, installation and the like, and releasing and supporting the rotor on a suitable bearing system when the gyroscope is ready for operation.

Gyroscopes known in the art employ various couplings between the rotor and its supporting member including gas lubricated bearings. Such gyroscopes, in which the rotor possesses two-degrees-of-freedom, may be provided with spherical bearings to support the rotor on the supporting shaft. The use of gas to spin the gyroscope rotor is also known.

Gas lubricated bearing type gyroscopes using spherical bearings are delicate precision instruments, and must be carefully protected against dust and moisture. They therefore are generally enclosed in tight casings which may be sealed. Moreover, the casings enclose considerable mechanism and electrical components, and access to the gyroscope unit not only may be difficult, but is quite likely to affect the operation of relatively delicate parts by allowing dust and moisture to enter the casings.

In many applications, it is important to prevent the rotor of the gyroscope unit from swinging haphazardly about its almost frictionless bearings during handling and shipment. Such relative movement subjects the parts to stresses not ordinarily provided for in the design and causes misalignment of the rotor spin axis from its desired preset position. It is customary, therefore, to "cage" the rotor by suitable means to provide preset alignment of the rotor spin axis with respect to the gyroscope housing, at least at start-up, and to "uncage" the rotor when the alignment has been achieved and the instrument is operating. The caging mechanism may be operated mechanically, for example, and may include a caging ring to contact the rotor, a spring to cause the ring to engage the rotor for caging, and a piston to withdraw the ring from the rotor when pressurized lubricant is supplied to activate the piston. The caging ring permits the rotor to spin about its axis, but constrains it to rotate in the plane determined by the caging ring.

Although such a caging mechanism provides for desired rotor alignment, it possesses the disadvantage of being mechanically complex and requires space in the gyroscope housing. For many applications the combination clamping and housing system of this invention makes such caging mechanism unnecessary. As a result, in accordance with this invention, a small compact gyroscope is provided which possesses only a minimum number of component members, is easy to manufacture and assemble, can be made at relatively low cost, and is reliable in operation. In certain applications caging the rotor for spin axis alignment may still be necessary and for such applications any suitable caging mechanism may be used in conjunction with the clamping and bearing system of this invention.

Figure 3:
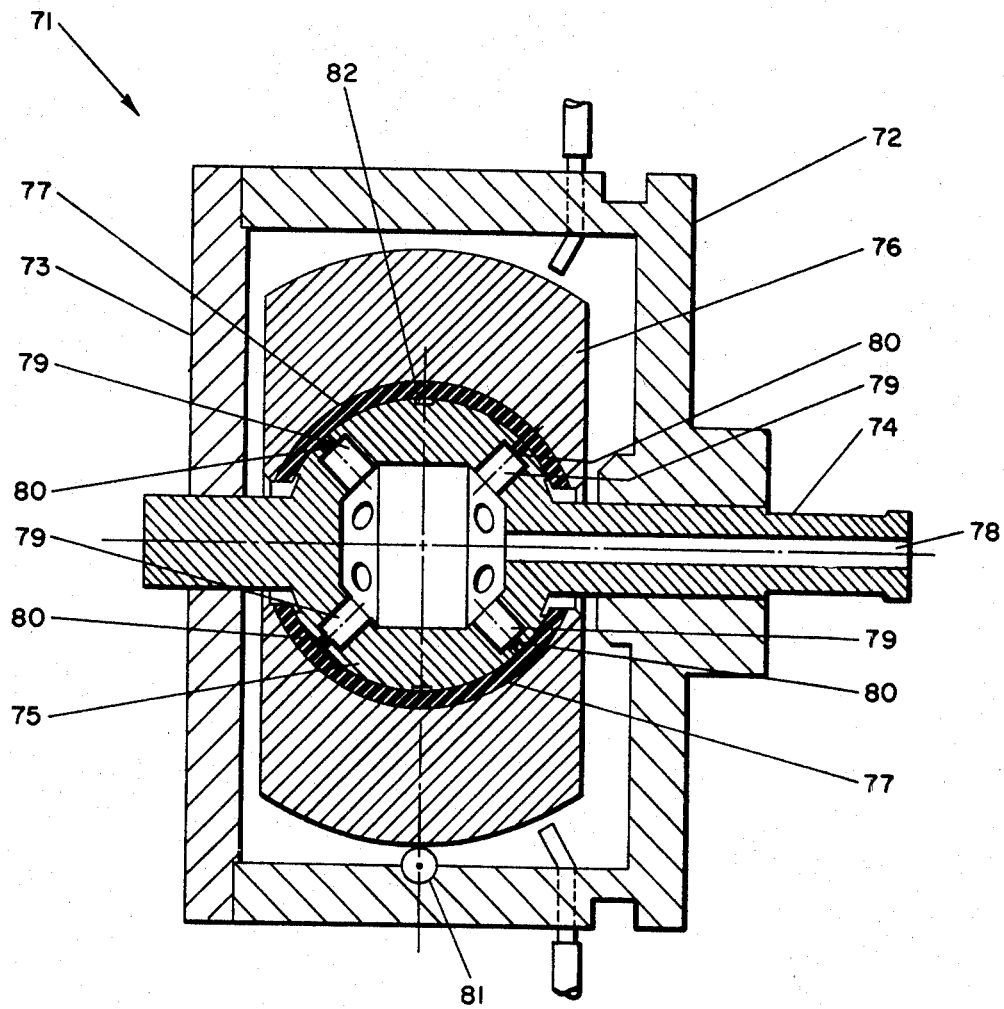
FIG. 3 is a diagrammatic section view of the invention incorporated in a directional gyroscope and wherein the confronting surfaces between the relatively movable members are spherical.

In FIG. 3 the novel clamping and bearing system of this invention is shown applied to a guidance gyroscope of the type employed with assault weapons. The gyroscope, generally identified at 71, comprises a housing 72 provided with a cover 73 attached thereto in any suitable manner. A shaft 74, having a spherical bearing portion 75 is secured in the housing and supports a two-degrees-of-freedom rotor 76. Rotor 76 includes a bearing surface of concave spherical contour provided with a layer of elastomeric material 77, which may be silicone rubber. The elastomeric layer 77 may be suitably fixed to the rotor and engages the bearing portion 75 in clamped relationship. As previously indicated, the clamping forces to constrain the rotor against relative movement on the shaft are provided by the self-opposed disposition of the confronting surfaces.

When the gyroscope is assembled the combination clamping and bearing system of this invention is in the clamping mode and constrains relative movement of the rotor on the shaft. Consequently all necessary rotor alignment can be carried out during gyroscope assembly and subsequent caging of the rotor is unnecessary. This is particularly useful in the assault weapon guidance gyroscope which has only a short time to run.

In further accordance with this invention the shaft 74 and the spherical bearing portion 75 are provided with an axial passage 78 and radial distributing passages 79 terminating in orifices 80. The orifices are located along two latitudes equidistant from the equatorial plane of the spherical bearing. These passages are provided for the purpose of feeding lubricant fluid under pressure to interface between the confronting surfaces of the elastomeric material 77 and the shaft 74.

When the lubricant fluid enters the interface between the confronting surfaces the elastomeric material is forced to yield elastically by compression against the rotor bearing cavity thereby forming a bearing profile. Thus, as has already been described with respect to the system shown in FIGS. 1 and 2, the rotor is capable of low friction movement supported on a load bearing film of lubricant. When compressed gas is supplied from the nozzles 81 the rotor is made to spin at high speed. An equatorial groove 82 on the spherical bearing portion 75, separating the elastomeric bearing into two bearing areas, is provided for the purpose of trimming shear-coupling drift of the rotor.

When the supply of the lubricating fluid is shut off, the bearing film between the confronting surfaces disappears and the combination clamping and bearing system of this invention reverts to its clamping mode.

What we claim and desire to secure by Letters Patent of the United States is:

1. In a system for selectively either movably supporting a first member relative to a second member or clamping said first and second members to constrain said relative movement, the combination comprising:
   a. an elastomeric layer forming the confronting bearing surface of one of said members and disposed under compression with the confronting bearing surface of the other of said members to constrain relative movement of said first and second members; and
   b. fluid passage means in one of said members for delivering a supply of pressurized fluid directly to the interface of said compressively contacting confronting bearing surfaces operative to deform said elastomeric layer in a direction away from the confronting bearing surface of the said other member to release the constraining action while at the same time establishing a bearing profile so that said first and second members are supported for relative movement on a film of said fluid.

2. The system recited in claim 1 wherein said elastomeric layer forms the confronting bearing surface of said first member and said fluid passage means is provided in said second member.

3. The system recited in claim 2 wherein said fluid passage means includes an axial fluid supply passage and a plurality of radial distribution passages communicating with said axial fluid supply passage and terminating in the same radial plane around the perimeter of the confronting bearing surface of said second member.

4. The system recited in claim 1 wherein said elastomeric layer extends beyond the edges of the mating confronting surface of said other member.

5. The system recited in claim 1 wherein said elastomeric layer exhibits a Poisson's ratio of greater than 0.45.

6. The system recited in claim 5 wherein said elastomeric layer exhibits a Shore A durometer hardness in the range of about 20 to 60.

7. The system recited in claim 1 wherein said elastomeric layer exhibits a shear modulus in the range of about 50 to 100 psi, a Poisson's ratio in the range of about 0.45 to 0.48, a Shore A durometer hardness in the range of about 20 to 60 and a thickness in the range of about 0.02 to 0.10 inches per inch diameter of member.

8. The combination comprising:
   a. a hollow housing;
   b. a rotor support member, said member having a spherical bearing surface portion with portions extending therefrom secured to said housing so that the spherical bearing surface portion of said member is disposed within said housing;
   c. a rotor having a spherical contour opening therein including an elastomeric layer to provide a bearing surface, said rotor adapted to fit about said rotor support member with said bearing surfaces of said rotor and rotor support member in self-opposed confronting relationship and with said elastomeric layer disposed under compression with the spherical bearing surface portion of said rotor support member so that said rotor and rotor support members are disposed in a clamped relationship; and
   d. fluid passage means operatively associated with said rotor support member for feeding a fluid lubricant under pressure directly to the interface of the self-opposed, confronting and compressively contacting bearing surfaces operative to elastically deform said elastomeric material in a direction away from the spherical bearing surface portion of said rotor support member and destroy the compressively contacting relationship and at the same time establish a bearing profile so that said rotor is supported for rotation about the rotor support member on a film of fluid lubricant.

9. The combination recited in claim 8 wherein said rotor includes a plurality of reaction surfaces disposed at the equatorial latitude of said rotor and nozzle means secured to said housing at the equatorial latitude thereof operative to provide for an impulse-turbine driving means to effect the desired rotation of said rotor.

10. The combination recited in claim 8 wherein said elastomeric material exhibits a shear modulus in the range of about 50 to 100 psi, a Poisson's ratio in the range of about 0.45 to 0.48, a Shore A durometer hardness in the range of about 20 to 60 and a thickness in the range of about 0.02 to 0.10 inches per inch diameter of said rotor.

11. The method of providing a self-acting combination clamping and bearing system comprising the steps of:
   a. coupling two members together to constrain relative movement thereof through an elastomeric material which forms the confronting bearing surface of one of said members, said elastomeric material being disposed under compression with the confronting bearing surface of the other of said members; and
   b. feeding a fluid lubricant under pressure directly to the interface of the compressively contacting confronting bearing surfaces of said two members to deform the elastomeric material in a direction away from the confronting bearing surface of said other member releasing the compressive contact and establishing a bearing profile so that said members are thereafter supported for relative movement on a load-bearing fluid film.

* * * * *